Nov. 13, 1934.                E. V. AMY                1,980,171

DISPERSING PARTICLES SUSPENDED IN AIR

Filed Jan. 27, 1932

Patented Nov. 13, 1934

1,980,171

UNITED STATES PATENT OFFICE 1,980,171

DISPERSING PARTICLES SUSPENDED IN AIR

Ernest V. Amy, New York, N. Y., assignor to Amy, Aceves & King, Inc., New York, N. Y., a corporation of New York Application January 27, 1932, Serial No. 589,231

23 Claims. (Cl. 299—28)

My invention relates to dispersing (by vaporization, precipitation, or otherwise) particles of foreign matters, particularly particles of water, specifically fog, and perhaps particles of other substances also, suspended in air in quantities, and especially to increasing materially the visibility in the atmosphere where this visibility is materially obstructed by the presence of such particles. Also it particularly concerns increasing the visibility in a relatively narrow lane or lanes extending in any desired direction from the observer.

A particle of foreign matter remaining at rest in any gas immediately about it, seems to be suspended because of the relation existing between its size, its weight, the density and viscosity of the gas surrounding it, and, in some cases, probably other factors also. Generally speaking, I propose to speed the dispersion of the particles, and in particle-laden air increase the visibility, by violently agitating the surrounding atmosphere and thus upsetting that relation of factors which causes the particles to remain more or less at rest each within the atmosphere immediately about it. More particularly, I agitate the particle-laden atmosphere by producing a wave motion therein of a rather high frequency or frequencies; the waves, it will be understood, are waves of the atmosphere. While I desire a high-frequency wave motion, at the same time the frequency must not be so high that too much of the energy is lost too near the source of the wave motion. For example, the attenuation of air waves having a frequency of 100,000 cycles per second is such as to reduce the amplitude to about 40% of its initial value at a distance of four feet from the sources. On the other hand, at a frequency of 25,000 cycles per second the amplitude of air waves is about 40% of its initial value at a distance of two hundred feet from the source. Generally speaking, I contemplate waves of a frequency within the range between about five thousand cycles per second and about one hundred thousand cycles per second. Preferably, so far as practical, I employ an ultra-sonic frequency or frequencies so that the operation may be inaudible, as well as for other reasons; such as frequencies above fifteen thousand or eighteen thousand cycles per second, which are inaudible to most persons at least; frequencies above twenty thousand cycles per second seem to be inaudible to even the most sensitive ears. All things considered I believe, at present, that a frequency or frequencies within the band of 14,000 to 60,000 cycles per second to be the most generally satisfactory.

It is to be understood that my invention is not limited to using a single frequency; a pure "sound", or a "sound" of a single pitch as it were; the wave motion may be simple, i. e. of a single frequency, or complex, i. e. include two or more frequencies.

While the energy dispersed in the waves must be sufficient to cause a material effect within the time during which the production of the waves continues (or such other shorter time as the needs of the particular situation may fix), it does not seem to be entirely necessary that the amplitude of the waves be great enough to thrust the foreign particles into contact and coalescence with each other to the point where the resulting larger particles or drops overcome air resistance and fall by gravity. Regardless of the amplitude of any wave, the initial relation of factors which, for example, originally caused a "fog", is disturbed in both the compression area and the rarefaction area of the wave, the passing of the compression area increasing the density of the air surrounding each particle in the path of the wave, and the passing of the rarefaction area reducing the density to less than its initial value. The extent to which these densities depart from the initial density depends on the amplitude, as will be understood. Furthermore, for air waves of the order of 30,000 cycles per second, there seems to be a large relative movement between the air and the minute particles or droplets of water of which fog seems to be composed. There are however other actions of wave motions tending to disperse particles of foreign matter than may be present.

The means employed to produce the wave motion is not of primary importance to my present invention. Devices analogous to various known sound-producing devices, pitched to the desired frequency or frequencies, are obvious expedients. Quartz piezo electric crystals, Rochelle salt crystals, magnetostriction oscillators, and high frequency modulation of jets of compressed air are others. Another is the acoustic generator wherein a gas jet having a velocity greater than the velocity of sound in the gas, is directed toward the mouth of a shell or hollowed block; the sort of device I am here referring to is described and discussed in the article by Hartmann and Troll entitled, "A New Acoustic Generator". The Air-Jet Generator", published in the Journal of Scientific Instruments, vol. 4, 1927, pp. 101–111; a device of this sort is illustrated in the accompanying drawing. Of course the means employed to produce the wave motion must be of such a nature that it can be made to deliver sufficient power in the form of the wave motion to accomplish its purpose.

In order to deliver energy in the form of wave motion at a sufficiently high rate, a number of wave-motion-producers or generators may be employed simultaneously, as a single source, in parallel as it were. Conceivably the wave-motion may be allowed to radiate in all directions from the source or generator. I contemplate however that it will be sufficient generally to direct the wave motion in a narrow lane or channel extending in some desired direction from the source or observer. Hence in order to most effectively use the energy of the generated wave motion, I propose, further, to concentrate the waves or wave motion into a single beam or pencil of rays. This can be done by the use of a reflector or reflectors; a suitable refractor or refractors would serve the same purpose. The apparatus can then be employed much as search lights are now employed at night aboard ship; indeed the device may be accompanied by a search light illuminating a path of increased visibility pierced in a fog by the wave motion. If desired, two or more of the devices can be used at a time of course, pointing in different directions. Furthermore, the beam-former or formers (e. g. reflectors) can be arranged to bring the rays to a focus, and thus the wave energy may be still more highly concentrated at a single spot; provision can be made also for shifting the position of the focus nearer to and farther away from the wave generator, so that the operator can advance and retract the focus along the lane to be cleared; or by gradually advancing the focus from a point near the apparatus, a cleared path pierced gradually deeper and deeper; with a plurality of generators, the same functioning can be obtained by shifting the directions of propagation with respect to each other.

The accompanying drawing illustrates embodiments of my invention, all more or less diagrammatically. Fig. 1 is a sectional view of an air-jet generator with its reflector. Fig. 2 is a sectional view of a quartz crystal generator with reflector. Figs. 3 and 4 are front and side elevations of a device for increasing the visibility which include a number of generators and auxiliary search lights as before suggested.

In the device of Fig. 1, the apparatus per se for producing the wave motion consists of a tube 1 having an orifice 2, and a hollow metal block 3 having its mouth 4 in line with the orifice 2. Bracket 5, adjustable along the tube 1, is illustrative of suitable means for adjustably holding the block 3 in place with respect to the tube 1 and its orifice 2. Air (gas, vapor) under an absolute pressure exceeding one and nine-tenths atmospheres (usually considerably in excess of this pressure), is supplied through the pipe 1 and orifice 2. The velocity of the air-jet then exceeds the velocity of sound in air. The block or oscillator 3 being placed at the proper distance from the orifice 2, wave motion of high intensity is produced in the surrounding air, and a wave motion having a frequency dependent on the diameter and length of the opening in the block or oscillator 3, as is understood. A reflector 6 serves to direct the waves into a single beam or pencil of rays; it may be parabolic, or substantially parabolic, in shape for example, and thus direct the waves into a parallel beam.

In order that the beam may be directed from side to side for example, trunnions 8 may be provided on the reflector; to accommodate this turning of the generator, the air under pressure can be conducted to the tube 1 through a flexible pipe of course. To a certain extent at least, there is, in addition to the wave motion, a flow of air of course with this form of generator, in the direction of the wave propagation. At present I regard this type of generator to be preferable, particularly because it permits large powers to be used.

Fig. 2 illustrates another form of wave-motion generator, by way of example. This employs a quartz crystal 11 mounted on a lead block 12 and faced with a thin metal electrode 13, the whole being submerged in oil in a case 14 to one side of which the lead block 12 is fastened. This type of generator for air waves of high frequencies is known, and need not be further described. The electrical connections for the electrodes constituted by the lead block 12 and metal facing 13 are indicated diagrammatically at 16. This generator for high frequency air waves also can be mounted in a reflector 15, which again may direct the air waves into a parallel beam.

Figs. 3 and 4 illustrate an assembly of a plurality of generators like that of Fig. 1 into a single unit, the reference characters 20, 21 and 22 indicating the wave-motion generators in these Figs. 3 and 4. In brief, the generators are here carried in a frame 23, each being carried by trunnions mounted in bearing brackets 24 for example, attached to the rear of the frame as indicated in Fig. 4, in order that the various beams or pencils of rays may be focused, i. e. crossed all at the same place, and this point of focus varied nearer to or farther away from the apparatus at the will of the operator. For this purpose, the center line of the trunnions of each of the generators 20, 21 and 22 is placed at right angles to that radius from the center 25 of the device which passes through the center of the particular generator; thus, for example, the center line 26 of the trunnions of that generator 22 which is at the extreme left of the apparatus in Fig. 3, is arranged at right angles to the radius 27 of the device, i. e. the trunnions of this particular generator are arranged vertically; similarly, the trunnions of generator 22 at the extreme right of the device in Fig. 3 are arranged vertically, the trunnions of the generators 20 are arranged horizontally, and the center line of the trunnions of each of the generators 21 is disposed at some proper angle to both the horizontal and the vertical. As a result of this mounting of the various generators 20, 21 and 22, the beams of the various generators can be projected out parallel to each other, in a common parallel beam or pencil of rays, or made to cross as desired by swinging the generators on their trunnions, as will be apparent. A common operating device may be employed, whereby all the generators 20, 21 and 22 may be swung on their trunnions as a unit to advance and retract the common point of focus of their beams. By way of example, such an operating device is illustrated in Fig. 4, where the frame 23 is shown mounted on a base plate 30, and the latter provided with a second frame member 31 for supporting the reciprocatable drag links 32, say one for each of the generators 20, 21 and 22, these drag links being connected to a common spider 33 provided with say a handle 34 whereby the operator can slide all the drag links forward or back at will and thus shift the point of focus of the device. The pipe 35 and suitable branches, also carried by the frame member 31, consitutes a common source of supply of gas under the proper pressure for the pipes 1 of the various wave-motion generators; to permit the angular movement of the generators described, the pipe 1 of each of them may be connected to this common source through flexible tubing, as indicated at 37. A pivot or vertical trunnion 38, mounted in a suitable sub-base (not shown) will serve to permit the device as a whole to be swung to the right or left at the will of the operator, as will be apparent. In the device of Figs. 3 and 4, an opening 40 is left at approximately the center of the device through which the observer may obtain a sight along the path or lane opened in the fog by the wave-motion generators. If desired, search lights 41 may be incorporated in the device to illuminate the path or lane.

It will be understood, of course, that my invention may be used in conjunction with other devices for getting rid of foreign particles, as well as alone, and that it is not limited to the embodiments or to the details of construction and operation above described, except as appears hereinafter in the claims.

I claim:

1. The method of dispersing foreign particles, which consists in producing, and for a time maintaining waves in and of the particle-laden atmosphere of more than substantially five thousand and less than one hundred thousand cycles per second and of adequate energy to materially speed dispersion.

2. The method of increasing the visibility in air laden with fog or the like, which consists in continuously producing, for a time, in the laden air, air waves of more than substantially five thousand and less than one hundred thousand cycles per second and of adequate energy to materially increase the visibility within the time within which the production of the waves continues.

3. The method of dispersing foreign particles, which consists in producing waves in and of the particle-laden atmosphere of a frequency greater than fifteen thousand cycles per second and less than one hundred thousand cycles per second, and of adequate energy and sustained for an adequate time.

4. The method of increasing the visibility in air laden with fog or the like, which consists in producing, and for a time maintaining, air-waves in the laden air of a frequency within the band of 15,000 to 60,000 cycles per second.

5. The method of dispersing foreign particles which consists in producing, and for a time maintaining, waves in and of the particle-laden atmosphere of an ultra-sonic frequency less than one hundred thousand cycles per second, and of adequate energy.

6. The method of dispersing foreign particles, which consists in producing waves in and of the particle-laden atmosphere of more than substantially five thousand and less than one hundred thousand cycles per second, and of adequate energy to materially speed the dispersion of the particles in a limited portion of the particle-laden space, collecting said waves into a pencil of rays, and directing the pencil into said limited portion of the particle-laden space.

7. The method of increasing the visibility in fog or the like, which consists in producing air-waves of a frequency greater than substantially five thousand cycles per second and less than one hundred thousand cycles per second, collecting the same into a pencil of rays, and directing the pencil into the laden air, the energy of the wave motion within the pencil being adequate to materially increase the visibility within the pencil.

8. The method of increasing the visibility in fog or the like, which consists in propagating air-waves, of a frequency greater than substantially five thousand cycles per second and less than one hundred thousand cycles per second, in the form of a pencil into the laden air, the energy of the wave motion within the pencil being adequate to increase the visibility within the pencil.

9. The method of increasing the visibility in fog or the like, which consists in propagating air-waves, of a frequency between fifteen thousand and sixty thousand cycles per second, in the form of a pencil into the laden air, the energy of the wave motion within the pencil being adequate to materially increase the visibility within the pencil within the time the propagation is continued.

10. The subject matter of claim 8, characterized by the fact that the pencil is a pencil of convergent rays.

11. The subject matter of claim 9, characterized by the fact that the pencil is a pencil of convergent rays.

12. The subject matter of claim 8, characterized by the fact that a pencil of convergent rays is employed, and that the convergency of the rays is varied during the propagation.

13. The subject matter of claim 9, characterized by the fact that a pencil of convergent rays is employed, and that the converging of the rays is varied during the propagation.

14. The subject matter of claim 8, characterized by the fact that the pencil is a pencil of convergent rays and that the pencil is expanded in the direction of parallelism, as the visibility is increased at the focus of the rays.

15. The subject matter of claim 9, characterized by the fact that the pencil is a pencil of convergent rays and that the pencil is expanded in the direction of parallelism, as the visibility is increased at the focus of the rays.

16. For increasing the visibility in fog and the like, the combination of a device to produce, continuously for a time, air waves of more than substantially five thousand and less than one hundred thousand cycles per second and of sufficient energy to materially increase the visibility locally, and means to direct said waves from said device in the form of a beam.

17. For increasing the visibility in fog and the like, the combination of a device for producing, continuously for a time, air waves of ultra-sonic frequency less than one hundred thousand cycles per second and of sufficient energy to materially increase the visibility locally, and means to direct said waves from said device in the form of a beam.

18. For increasing the visibility in fog or the like, the combination of means for producing, and for a time maintaining, air waves of ultra-sonic frequency less than one hundred thousand cycles per second, and means for collecting the same into a pencil of rays, the first mentioned means producing wave motion having sufficient energy to materially increase the visibility within the pencil for a material distance from the source.

19. For increasing the visibility in fog or the like, the combination of a plurality of generators of air waves of more than substantially five thousand and less than one hundred thousand cycles per second, means for collecting the wave motion of each of said generators into a pencil of rays, and means for supporting the same in such a relation that the plurality of pencils form a single pencil, the generators producing air waves having sufficient energy to materially increase the visibility within the said single pencil.

20. The subject matter of claim 19, characterized by the fact that a number of said plurality of pencils of rays cross each other.

21. The subject matter of claim 19, in combination with means for changing the direction of a number of said plurality of pencils of rays, to cause the same to cross at different distances from said generators.

22. The subject matter of claim 19, in combination with means for directing a ray of light along and within said single pencil.

23. The subject matter of claim 18, characterized by the fact that said means for collecting the wave motion into a pencil of rays, consists of a reflector.

ERNEST V. AMY.